(12) United States Patent
Ghadamossoltani

(10) Patent No.: US 10,155,642 B2
(45) Date of Patent: Dec. 18, 2018

(54) INTELLIGENT ESCALATOR EMERGENCY STOP SYSTEM (IE2S2)

(71) Applicant: Amir Hussein Ghadamossoltani, Tehran (IR)

(72) Inventor: Amir Hussein Ghadamossoltani, Tehran (IR)

(*) Notice: Subject to any disclaimer, the term of this patent is extended or adjusted under 35 U.S.C. 154(b) by 172 days.

(21) Appl. No.: 15/033,627

(22) PCT Filed: Feb. 16, 2015

(86) PCT No.: PCT/IB2015/000367
§ 371 (c)(1),
(2) Date: Apr. 30, 2016

(87) PCT Pub. No.: WO2015/121751
PCT Pub. Date: Aug. 20, 2015

(65) Prior Publication Data
US 2016/0272467 A1    Sep. 22, 2016

(30) Foreign Application Priority Data

Feb. 16, 2014  (IR) .................. 139250140003011056

(51) Int. Cl.
*B66B 29/00*   (2006.01)
*B66B 25/00*   (2006.01)

(52) U.S. Cl.
CPC ............ *B66B 29/00* (2013.01); *B66B 25/006* (2013.01); *B66B 29/005* (2013.01)

(58) Field of Classification Search
CPC ..... B66B 25/00; B66B 25/003; B66B 25/006; B66B 27/00; B66B 29/00; B66B 29/005
USPC ........................................................ 198/323
See application file for complete search history.

(56) References Cited

U.S. PATENT DOCUMENTS

| | | | |
|---|---|---|---|
| 6,606,538 B2 * | 8/2003 | Ponsot .................... | B66B 25/00 198/322 |
| 7,110,569 B2 * | 9/2006 | Brodsky ............ | G06K 9/00335 348/169 |
| 9,896,309 B2 * | 2/2018 | Wang ...................... | B66B 25/00 |
| 2017/0046575 A1 * | 2/2017 | Zhao .................. | G06K 9/00778 |
| 2018/0029838 A1 * | 2/2018 | Fang .................... | B66B 29/005 |

FOREIGN PATENT DOCUMENTS

JP   WO 2008146672   * 12/2008

* cited by examiner

*Primary Examiner* — Gene O Crawford
*Assistant Examiner* — Keith R Campbell
(74) *Attorney, Agent, or Firm* — Azadeh Saidi

(57) ABSTRACT

The present invention constantly observes the balancing condition of users; at the first few signs of an occurrence of an accident such as falling, slipping, sitting on the escalator the system immediately initiates an emergency stop command.

26 Claims, 12 Drawing Sheets

INTELLIGENT ESCALATOR EMERGENCY STOP SYSTEM (IE2S2)

FIELD OF INVENTION

Electronics—Telecommunications—Previous knowledge of evaluation and safety"

BACK GROUND OF THE INVENTION

Escalators are high-risk machines which constantly move, hard and dangerous metal stairs using a spinning engine. Escalators are used by people from different age groups as well as the disabled. Nowadays, embedding an emergency stop button at the bottom/top of the escalators increases the safety of the machines. However in the ordinary escalators, it is impossible to restore the balance of the fallen person or release on his clothing, shoes or accessories that are stuck in the escalator since the motion of the escalator is constant. (i.e. An accident led to the death of a 47-year-old woman in February 2014 on an escalator in the subway station FABER in Montreal Canada)

According to the statistics regarding the incidents occurring on the escalators, this is not an effective means of prevention. Reasons for the lack of proper performance of the emergency stop buttons include:

1. At the occurrence of an accident the presence of another person is required in order to press the emergency button. However, this person needs to be close enough to the escalator to firstly see the accident and secondly be near the emergence button and act fast enough to stop the escalator.
2. When an accident happens, the helping person should be aware of existence of such an emergency button and know how to use it.
3. This method is highly dependent on the reaction time of the helping person, his speed and his awareness.
4. The emergency button usually is inactive (the escalator's agents often disable these emergency buttons due to the misuse of it)
5. During the accident, the helping person should be patient and make a correct decision in a short time.

The possibility that all these requirements are simultaneously satisfied in the case of an accident is very low. Therefore the emergency button does not play a great role in decreasing the accidents.

According to statistics provided by the American safety products Committee, annually 12000 persons in the U.S. have got in troubles when using escalators. Wherein 70% of these accidents are dangerous and 10% of them lead to amputation, crushing bone anomalies and even the person's death!

With a simple search on the net, one could find a lot of tragic news and pictures related to such incidents occurring on the escalators. The study of these facts necessitates the use of a protective circuit with high speed and intelligent action for emergency stop of the escalators. Therefore there was a need for a new safety device which we discuss further in the specification. Given that escalators are used publically by people from different age groups, using this protective system is essential to increase the safety level of the escalators.

SUMMARY OF THE INVENTION

IE2S2 (Intelligent Escalator Emergency Stop System) is a very smart guard with a high speed of operation that protects the passengers and guarantees their safety when they ride escalators. Given that escalators are used publicly by people from different age groups, using this protective system is recommended to increase the safety level of the escalators.

This invention is designed to increase the safety level of the escalators. This system continuously analyses the situation of escalator users. When an accident such as imbalance, trap or falling happens while riding the escalators, this system immediately stops the escalator. By using IE2S2, it is possible to detect the accidents accurately and fast, hence issue the emergency stop command to the escalator engine.

After the escalator is stopped, the person can easily find his lost balance or release his clothes and shoes from the escalator. The speed of detection an accident on the escalator is imperative to prevent damages. Restarting the escalator is possible in two adjusted ways.

1—Automatic Setup: After the person has recovered his/her balance or has released his/her shoes or clothes from escalator's comb, an adjustable timer will be activated and the escalator will be automatically set-up. A variety of artificial intelligent algorithms for sound, image and data analysis or a mixture of them can be applied to restart the system in a more certain way to improve the next generation of these systems.

2—Manual setup: The restart will be initiated manually only by an escalator agent. This is a more reliable method than the method of automatic startup, yet more costly and time consuming.

In this system, there are algorithms for detecting overcrowding from incidents, as well as determining the escalator's speed and self-correcting data from the main algorithms of accident detections. Another feature of this system is its recognition ability which can distinguish a human standing on the escalator from a long horizontal object such as a rug, entering the escalator. This makes the system smart enough to issue the stop command only when an accident occurs.

Other unique features and advantages of this system will be mentioned later in the claim section. To reduce the cost and ease the installation and maintaining the secure gates through the path of an escalator, it is wise to install the elements of the invention only in a few specific steps rather than the whole motion path. These safety gates can be installed in three or four points in an escalator. A gate at the start of the escalator path, one or two gates in the middle and one at the end of the escalator path (Gate 1, Gate 2, Gate 3 and Gate 4 respectively) can enable an escalator to maintain the required safety level.

DETAILED DESCRIPTION OF THE INVENTION

Figure 1:
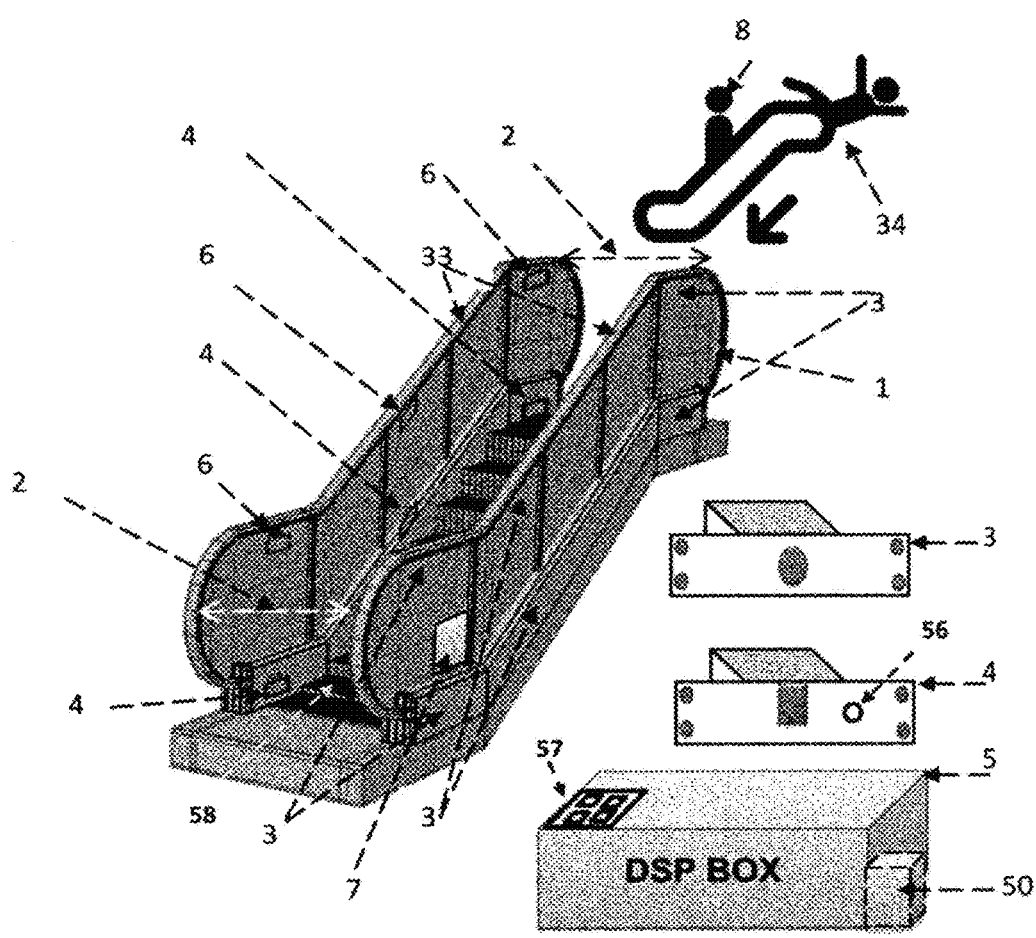
FIG. 1, shows a perspective view of an escalator mounted with an example embodiment of the invention. It also shows the main modules of that example embodiment.

Referring to FIG. 1, an embodiment of the invention may include a set of sensing devices (3, 4 and 6) to detect objects (8, 9, 14, 30 and 31) on an escalator (1). The sensors (3, 4, and 6) can be installed in various fixed spots of the escalator (1) in order to track the objects (8, 9, 14, 30 and 31) as the escalator (1) moves. In a preferred embodiment, the sensors (3, 4, and 6) are installed along straight lines parallel to the path of the escalator (1). It is preferred that each of the lines have a fixed height from steps (58) of the escalator (1). So, when an object enters the escalator (1), it is first "seen" by a first sensor (3) in the line, and then it is seen by the other sensors in the line in order (4 and 6).

Referring to FIG. 1, in a preferred embodiment, the sensors (3, 4 and 6) can be Infrared (IR) sensors. As the IR sensors usually work in 34 to 42 KHz frequency range, they are isolated from other emitters. It is also unlikely that they cause any interference to other communication channels. The output of an IR sensor is TTL, i.e. 0 or +5 DC Volts. This digital output helps to simplify the design of the associated methods. An IR sensor comprises of a transmitter and a receiver. In one embodiment, a transmitter (3) and two receivers (4 and 6) can be installed in exact opposite spots on either sides of the escalator (1). In another embodiment, the transmitter (3) and the receivers (4 and 6) can be installed in the same place, and a mirror needs to be installed in the exact opposite spot. Herein and after, this pair of the transmitter and the receivers optionally accompanied by a mirror, is called an IR-Line.

In a preferred embodiment, the narrow beam IR sensors may be used, so they do not interfere with one another. It is worth noting that the IR sensors are usually considered cheap relative to other applicable sensors. Since the IR sensor is an emitter, it does not depend on the lighting condition of the environment, i.e. it will work just fine in the dark.

In another embodiment, one might consider using LASER or optical sensors instead of the IR sensors. These sensors can detect whether any object is in front of them, or their front view is empty. So the output of these sensors is digital just like the IR sensor. In fact, any sensor that behaves in a similar manner can be used instead of the IR sensor. It is worth noting that the LASER and optical sensors can also work in any lighting conditions of the environment similar to the IR sensor.

Figure 12:
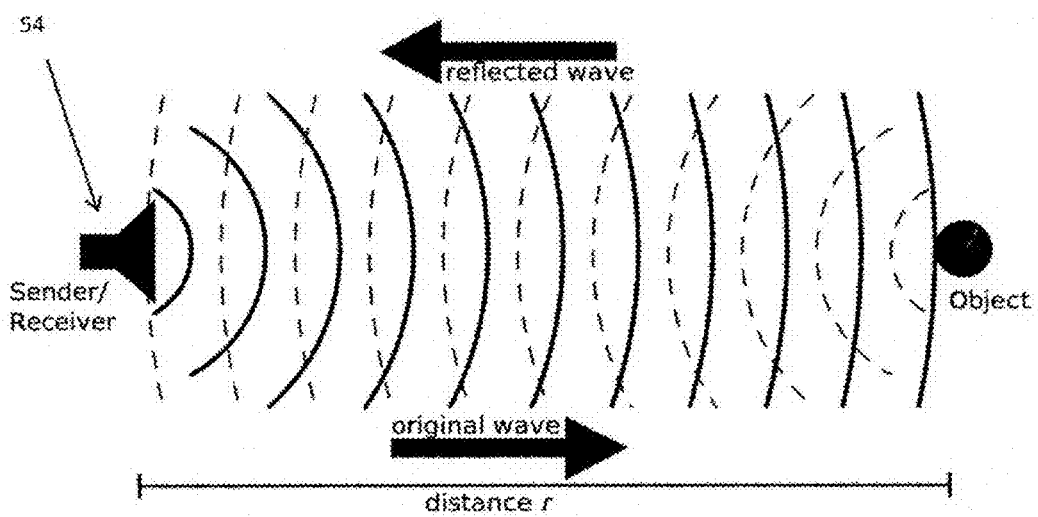
FIG. 12, illustrates the technique used by ultrasonic sensors to measure the distance between the transceiver and an object.

Referring to FIG. 12, in another embodiment, one might use an ultrasonic sensor (54) or any type of electromagnetic transceiver instead of the IR sensor. These sensors provide the distance to the object which is in front of them. The distance between the two sides of the escalator (1) is fixed and equals the width (2) of the escalator (1). Now, when an object (8, 9, 14, 30 and 31) enters the view of these sensors, the distance reported by the sensor will be less than the fixed width (2) of the escalator (1). So using a simple calculation, the distance reported by the sensor can be used to detect the presence or absence of an object in front of it.

Figure 10:
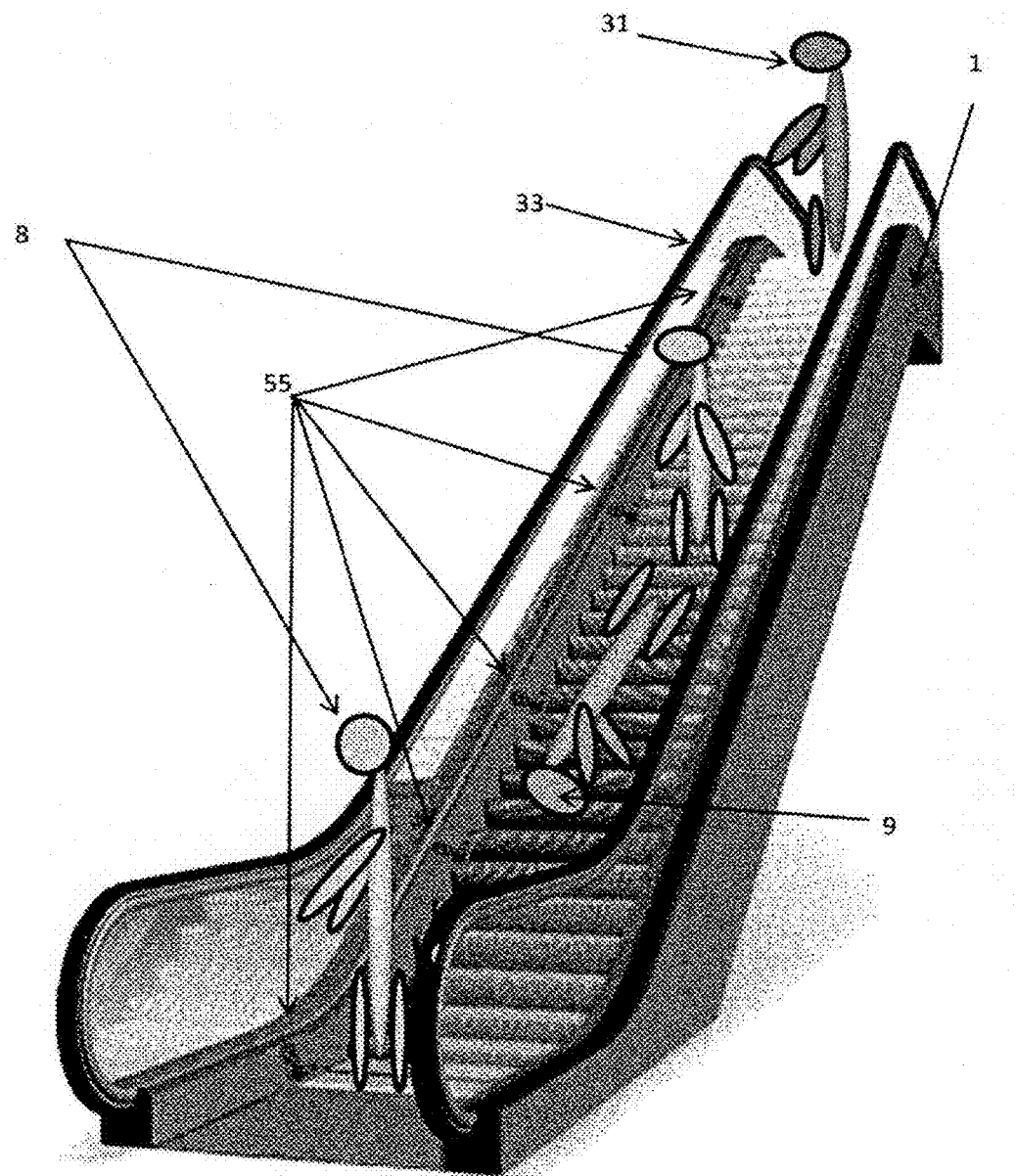
FIG. 10, is an example embodiment which uses ordinary cameras as its sensors.

Referring to FIG. 10, in another embodiment, an imaging device such as an ordinary camera (55) can be used to generate a stream of pictures of the objects (8, 9, 14, 30 and 31) in the escalator (1). Depending on the view angle of the device and the length of the escalator (1), multiple such devices might be necessary to cover all the objects (8, 9, 14, 30 and 31) in the escalator (1). The output of these devices/cameras (55) can be merged into a single picture. This picture or the original pictures can be analyzed by an Artificial Intelligent method to detect whether an accident has happened.

Figure 11:
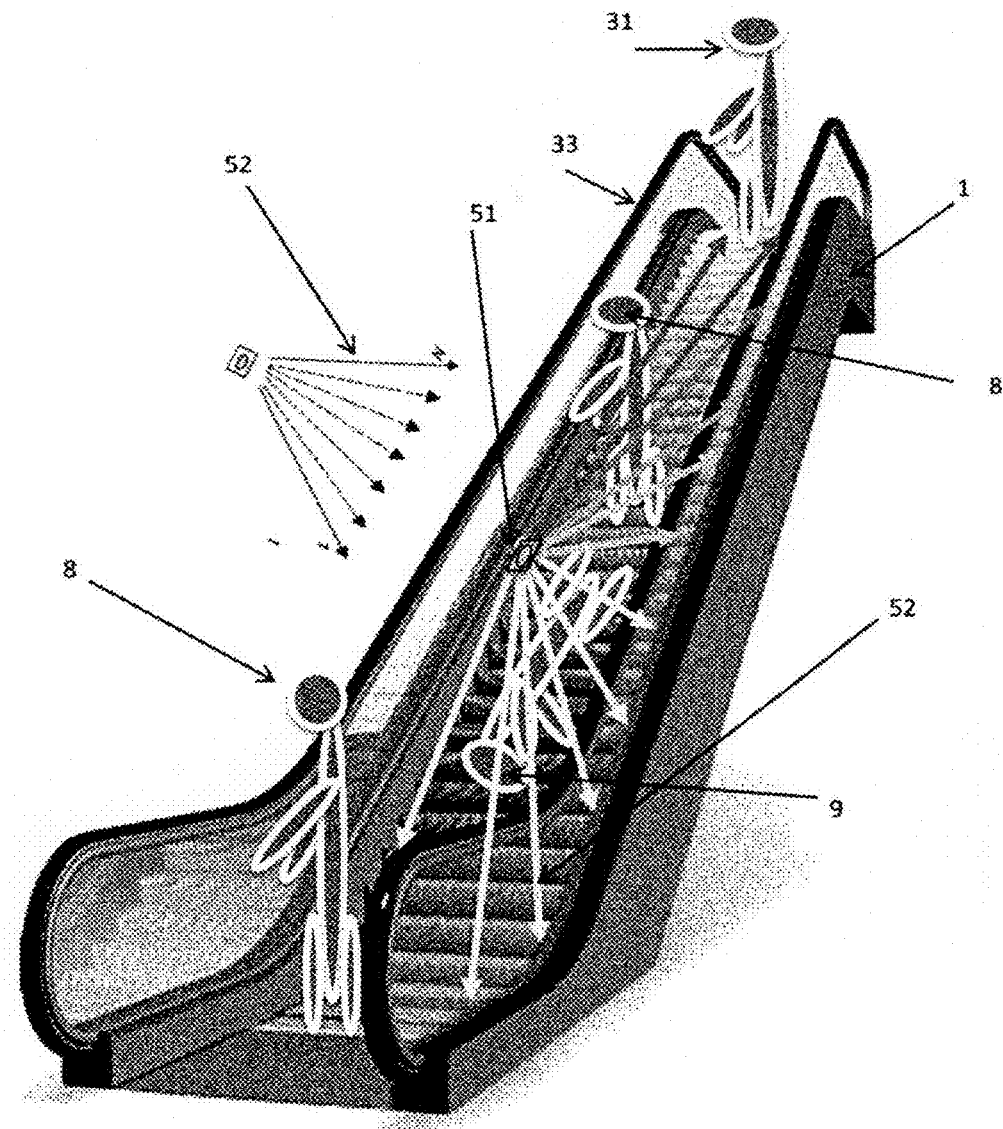
FIG. 11, is an example embodiment in which a single electromagnetic transceiver such as a SAR antenna is used instead of multiple sensors.

Referring to FIG. 11, in another embodiment, one might consider using a Synthetic Aperture Radar (SAR) as the imaging device. The SAR antenna (51) can be fixed in the middle of the escalator (1) and can generate images of the scene as the escalator (1) moves. The output of SAR can be used just like the output of an ordinary camera. One benefit of the SAR technique is that the SAR antenna has a wide pattern (52). So a single SAR antenna (51) can cover a wider view than multiple cameras. It can also work in any lighting condition of the environment.

Referring to FIG. 1, an embodiment of the invention may include a central processing unit (5), called "the processor", to analyze the sensors data, and to conclude that whether an accident has happened. This unit (5) may comprise of analog or digital circuitry or a mixture of both. In a preferred embodiment, one might use a Digital Signal Processor as the core of the processor (5). In another embodiment, one might use a low profile micro-controller or micro-processor as the core of the processor (5).

In a preferred embodiment, the additional job of the processor (5) is to act appropriately when an accident has happened. The most appropriate action would be to stop the escalator (1) immediately. Another appropriate action is to sound an alarm and notify the guards.

Referring to FIG. 1, a preferred embodiment of the invention may include means for emergency stopping of the escalator (1) (called "the controller") (50), upon the receipt of the appropriate command from the processor (5). In a preferred embodiment, the controller (50) may also have the capability of restarting the escalator (1) after an emergency stop, upon the receipt of the appropriate command from the processor (5).

Referring to FIG. 1, an embodiment of the invention may include an alarming device (7) (called "the alarm") to sound an alarm when an accident has happened or the system needs maintenance. The alarm should be able to receive commands from the processor (5) to start and to stop alarming. In case of an accident, the alarm (7) should notify the guards and passengers and also the emergency agencies. But when the system needs maintenance, for example when the sensors (3, 4 and 6) need calibration, or a component is failing, the alarm (7) should only notify the guards. In case of an accident, the alarm (7) may generate a loud sound to notify people in the area. The alarm (7) may use the cell network (e.g. GSM) or the Internet or any similar technology, in order to notify the guards and the emergency agencies.

Referring to FIG. 1, an embodiment of the invention may include communication media (60) between the processor (5) and other components of the invention, namely the sensors (3, 4 and 6), the controller (50), and the alarm (7). These media can either be wired or wireless. It is preferred to use wired communications when possible, and opt out to wireless when the former is infeasible. For example, it is preferred that the media between the processor (5) and the sensors (3, 4 and 6) to be wired, yet if the alarm (7) is distant, the media between the processor (5) and the alarm (7) is preferred to be wireless. Those skilled in the art can identify which communication media and protocols needs to be used, depending on the type of and the distant between the components.

Referring to FIG. 1, a preferred embodiment may include a Light Emitting Diode (LED) (56) for aligning each pair of transmitter (3) and receivers (4 and 6). When the transmitter and the receiver are aligned, the LED (56) would be turned on, otherwise it will be off. This is useful when the sensors are to be used as pairs, such as the IR sensors which are installed in pairs at the opposite sites of the escalator (1). The LEDs (56) are only used when installing the sensors (3, 4 and 6) and are not required later, unless the sensors get misaligned over time.

Referring to FIG. 1, an embodiment of the invention may include a control panel (57) to adjust various parameters of the components. For example, an on/off switch might be present on the control panel (57) to enable/disable the sound alarm (7).

In what follows, a few example embodiments of the invention are presented to show how different components of the invention can be chosen and assembled, in order to make a working system. But, it should be obvious that these choices do not limit the invention in any implied or expressed way, and these embodiments are provided just as examples to further illuminate how the invention can be used in practice.

Figure 2:
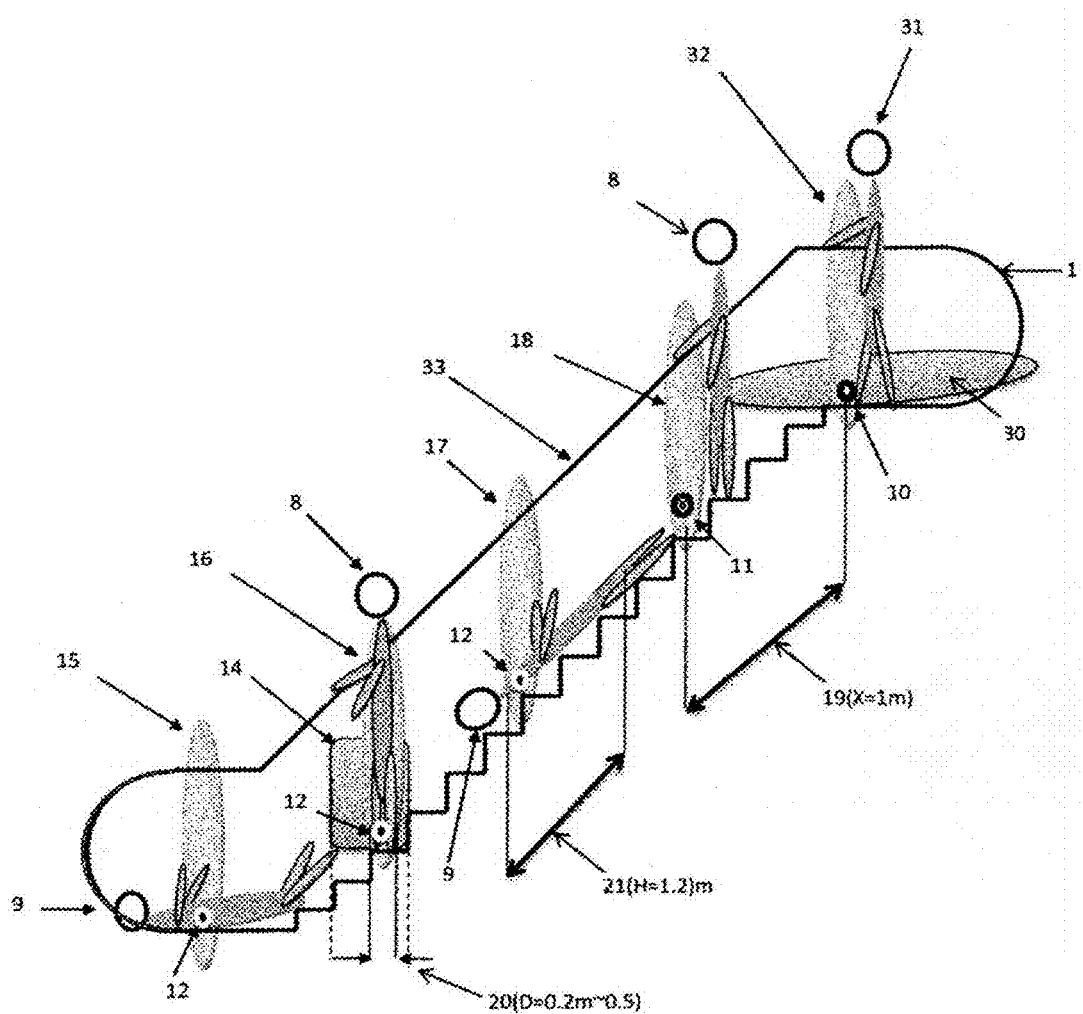
FIG. 2, is a 2D view of an example embodiment used to detect an accident in normal passenger traffic.
Figure 3:
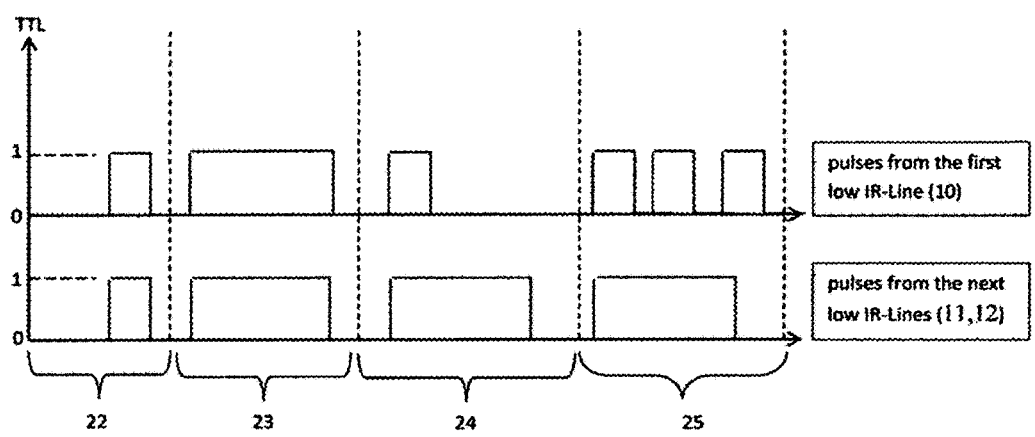
FIG. 3, shows how the example embodiment of FIG. 2 uses the pulses detected by the first (10) and second (11, 12) low IR-Lines to detect an accident in normal passenger traffic.

In the example embodiment of FIG. 2, five IR-Lines (10, 11 and 12) are installed near the steps (58) of the escalator (1) with the same height (about 5 cm). Let's assume the speed of the escalator (1) is known prior and equals V. When an object (8, 9, 14, 30 and 31) with width equals D (20) passes an IR-Line (10, 11 and 12), it disconnects the IR-Line for $T=D*V^{-1}$ seconds. This time can be measured using a timer circuit. So the length of the object (8, 9, 14, 30 and 31) can be computed as $D=T*V$. Now let's consider a few scenarios. The first scenario is when a person (31) enters the escalator (1) and leaves normally (8). Since the width detected by the IR-Lines (10, 11 and 12) is not changed, they all report almost the same width. This is detected as a normal condition and no action is necessary (22).

The second scenario is when a person (31) enters the escalator (1) normally, but later loses his or her balance and falls (9). So the width detected by the first IR-Line (10) corresponds to the normal person foot width. This width is usually 20 cm for a person without a suitcase, and 50 cm for a person with a suitcase (14). But the width detected by at least one other IR-Line (11, 12) will correspond to the length (21) of a fallen person (9) on the escalator (1). This length (21) will include at least the head and the body, but might not include the legs, because the fallen person might be moving his or her legs up and down due to the stress. This effective length (21) is considered to be at least 120 cm. Now because the difference between the width reported by the first IR-Line (10) and that of a later IR-Line (11, 12), is more than 70 cm, this is reported as an accident (24).

The third scenario is when a wide object (30) enters the escalator (1) and exits normally. Whether a person (8, 31) is with the object or not, the width reported by all IR-Lines (10, 11 and 12) will be similar. So even if the length of this object is more than 120 cm, it will be detected as a normal wide object (30) and no accident is reported (23).

The forth scenario is when a crowd of people walk into the escalator (1). When each person (31) steps into the escalator (1), the width detected by the first IR-Line (10) is less than 50 cm. Then, due to over crowdedness, the people will be standing next to each other, leaving no space between their legs. So, the width detected by the next IR-Lines (11,12) can be more than 120 cm. So an accident may be reported incorrectly (25).

Figure 6:
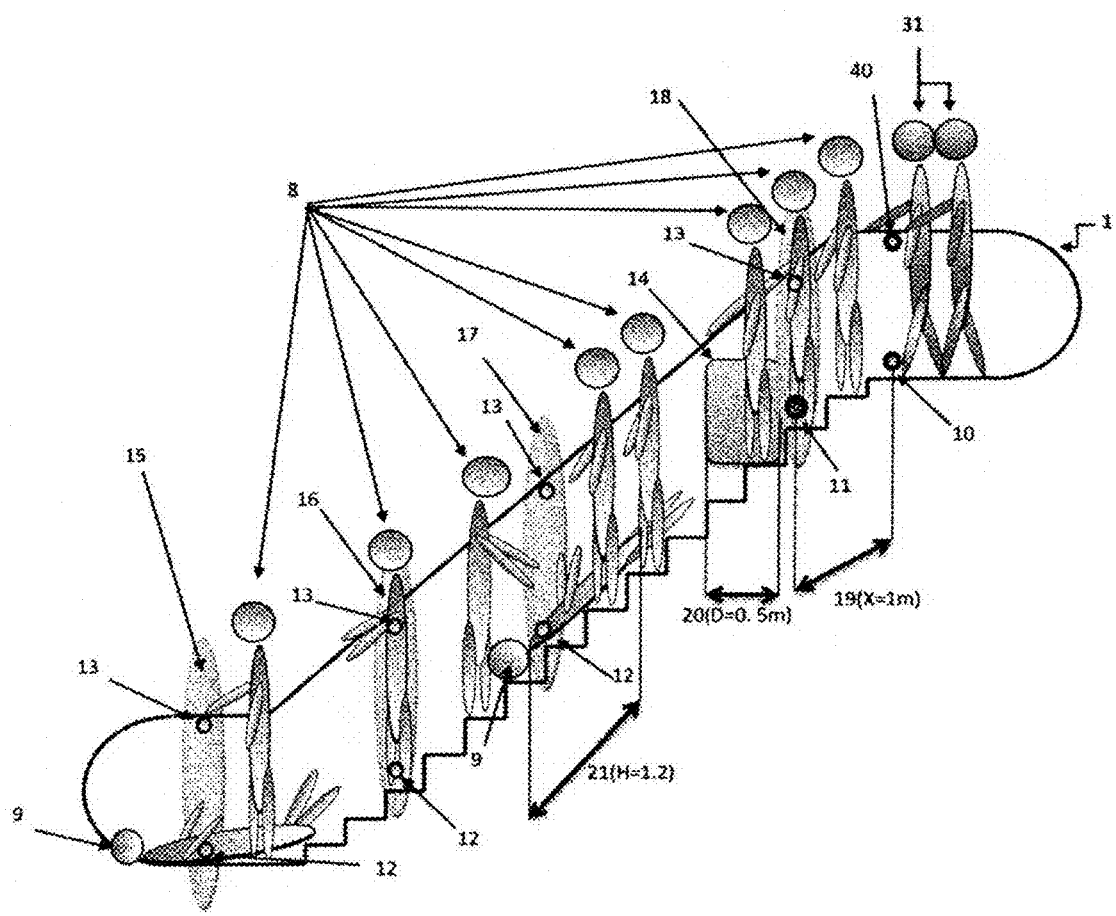
FIG. 6, is a 2D view of an example embodiment used to detect accidents in an over crowdedness situation.
Figure 7:
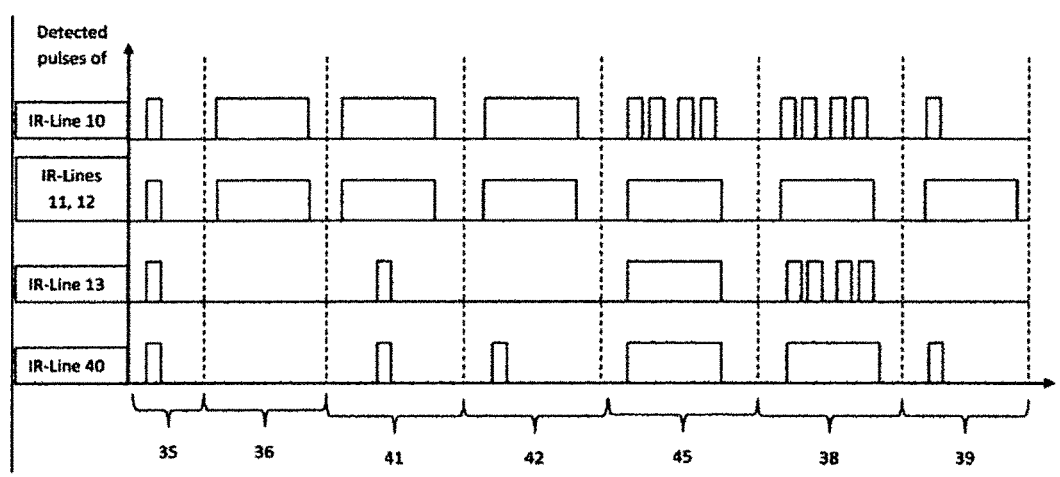
FIG. 7, shows how the example embodiment of FIG. 6 uses the pulses detected by the IR-Lines to detect an accident in an over crowdedness situation.

To address this shortcoming, another example embodiment is illustrated in FIG. 6. This example embodiment, includes a few additional IR-Lines (13, 40) which are installed at the top of the low IR-Lines (10, 11, 12), just under the handle (33) of the escalator (1). The top IR-Lines (13, 40) are vertically aligned to the low IR-Lines (10, 11, 12). Now let's consider a few scenarios similar to the above scenarios, to see how the new example embodiment compares to the previous one.

The first scenario is when a person (31) enters the escalator (1) in solitude and leaves normally (8). So the width detected by all IR-Lines (10, 11, 12, 13 and 40) is the same and is shorter than 50 cm. Therefore it is reported as a normal condition (35).

The second scenario is when a person (31) enters the escalator (1) in solitude normally, but later loses his or her balance and falls (9). So the width detected by first low (10) and top (40) IR-Lines is less than 50 cm, but the width detected by one of the next low IR-Lines (11,12) is more than 120 cm. And the corresponding top IR-Line (13) does not detect any object. This is reported as an accident (39).

The third scenario is when a wide object (30) enters the escalator (1) and leaves normally. So the width detected by all low IR-Lines (10, 11, 12) will be equal to the length of the object that can be more than 120 cm. But the top IR-Lines (13, 40) will not detect any object. This is detected as a normal wide object (30) and no accident is reported (36).

Another version of the third scenario is when a person (31) carrying a wide object (30) enters the escalator (1), and leaves normally. So the width detected by the low IR-Lines (10, 11 and 12) will be equal to the length of the object that can be more than 120 cm. But the width detected by all top IR-Lines (13, 40) will be equal to the width of the person which is less than 50 cm. This is detected as a normal person (8) with a wide object (30) and no accident is reported (41).

Another version of the third scenario is when a person (31) carrying a wide object (30) enters the escalator (1) normally, but later loses his or her balance and falls (9). The width detected by the low IR-Lines (10, 11, 12) will be equal to the length of the object that can be more than 120 cm. The width detected by the first top IR-Line (40) will be equal to the width of the person which is less than 50 cm. But at least one of the other top IR-Lines (13) will not detect any object. This is detected as a fallen person (9) with a wide object (30), and an accident is reported (42).

The forth scenario is when a crowd of people walk into the escalator (1) and no one falls. When each person (31) steps into the escalator (1), the width detected by the first low IR-Line (10) is less than 50 cm. Then, due to over crowdedness, the people will be standing next to each other, leaving no space between them. So, the width detected by the next low and top IR-Lines (11, 12, 13) can be more than 120 cm. This is detected as over crowdedness (37) and no accident is reported. In this case, the first top IR-Line (40) is not used at all. It is worth noting that while people are standing next to each other, either it is not possible for a person to fall, and even if he or she falls, it will make the crowd apart. This will cause the top IR-Lines (13) to reconnect. So it can be distinguished from the current scenario, and is described in the next paragraph.

Another version of the forth scenario is when a crowd of people walk into the escalator (1) and one of them falls. Same as the first version of the scenario, the width detected by the first low IR-Line (10) is less than 50 cm. Since a person (9) has fallen, the width detected by one of the next low IR-Lines (11, 12) will be more than 120 cm. But the corresponding top IR-Line (13) will not detect the same width, because although several people (8) are on the escalator (1), they are separated by the fallen person, or they were not too much close in the first place. This is detected as an accident in the crowd (38). In this case, the first top IR-Line (40) is not used at all.

Although the speed of the escalators is fixed and is usually between 0.2 to 0.8 m/sec, the speed of different escalators can be different. So either the speed should be specified in design time, and thus the product will be limited to a certain type of escalators. Or, the other choice is to provide means for computing the speed of the escalators. In the example embodiment of FIG. 2, when an object enters the escalator (1) for the first time since it is turned on, the speed of the escalator (1) can be measured as follows. First, the object disconnects the first low IR-Line (10), and then it disconnects the second low IR-Line (11). If the difference between these two disconnect times is denoted as T, and the distance between the first IR-Line (10) and the second IR-Line (11) is denoted as X (19), then the speed of the escalator (1) is computed as $V=X*T^{-1}$.

Figure 4:
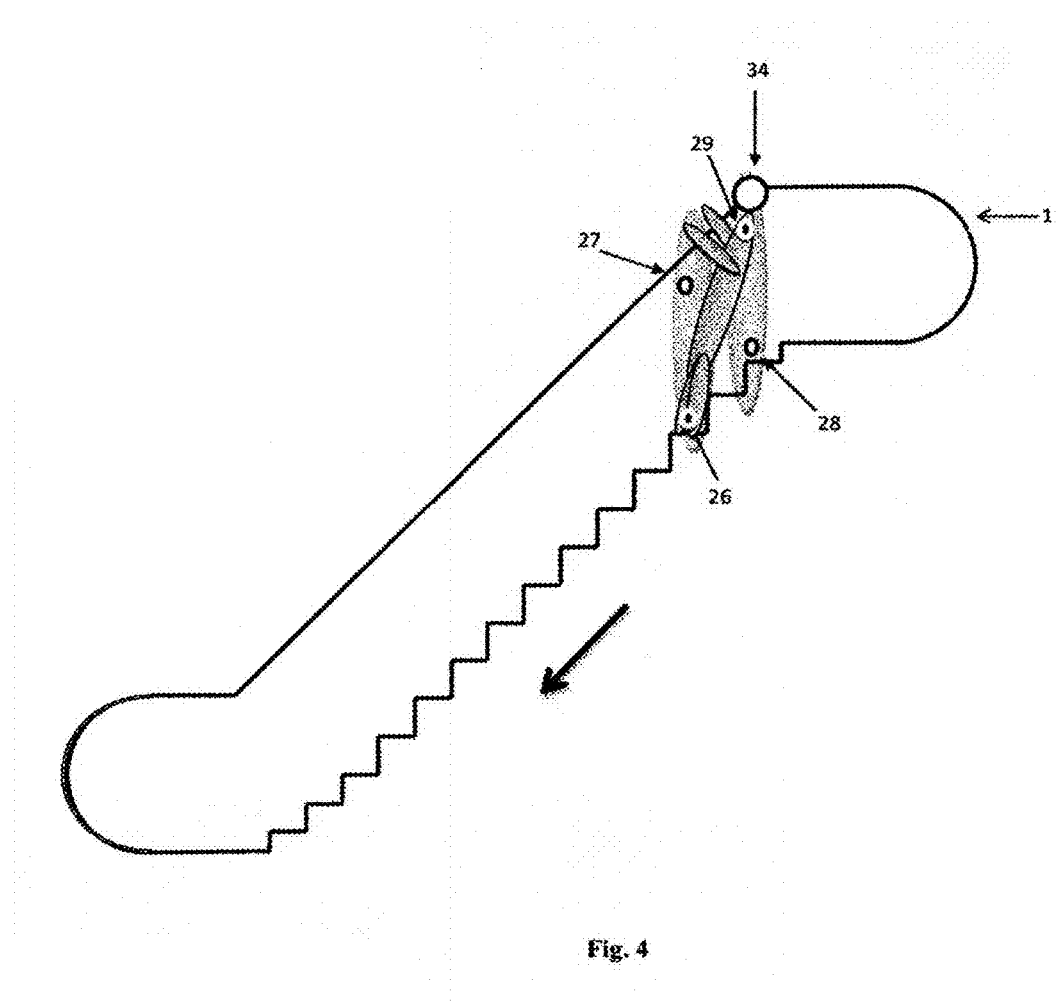
FIG. 4, illustrates an example embodiment which is able to detect whether a person is losing balance upon entering the escalator (1).
Figure 5:
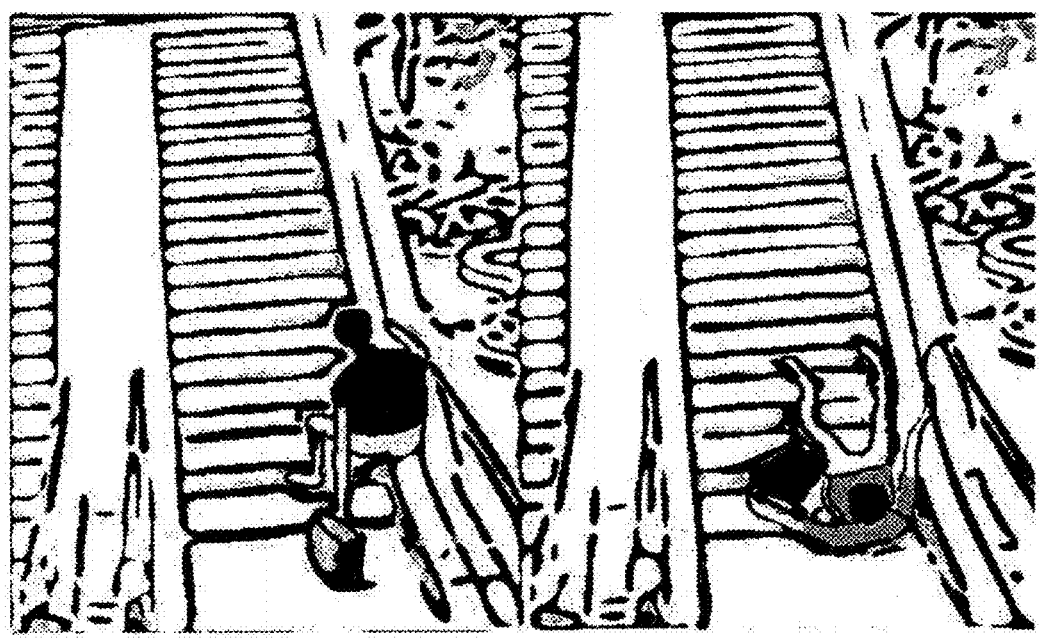
FIG. 5, is an unfortunate real life example of a person losing his balance upon entering an escalator.

The example embodiment in FIG. 4, which includes only four IR-Lines (26, 27, 28 and 29), has the ability to detect that a person (34) has lost his or her balance upon entering the escalator (1) and is falling. Since the escalator (1) is moving forward, when a person (34) loses balance upon entering, he or she will always fall backward. This fact is illustrated in the real photo in FIG. 5. Referring to FIG. 4, when this happens, there will be a moment that the person (34) will simultaneously disconnect the first top IR-Line (29) and the second low IR-Line (26), and at the same time, the first low IR-Line (28) and the second top IR-Line (27) are connected. This is detected as a loss of balance of a person. So even before the accident completely happens, the appropriate actions are taken, just like when an accident has happened. It should be obvious that this example embodiment can be merged with the previous example embodiments. That is, the method described here is compatible with the previous methods.

An example embodiment of the invention that can be readily implemented using a micro-controller is described here. To simplify the implementation, a subset of the features available to the invention is selected. To save space, this example is demonstrated in FIG. 6 which is previously used to describe another example. This example embodiment does not use the first low and top IR-Lines (10, 40) of FIG. 6, and thus has no means of measuring the speed of the escalator (1). So the speed should be specified as an input to the device either in design time or through a control panel (57) by the user. For the sake of simplicity, the speed of the escalator (1) is assumed to be known a priori in design time. This example uses each pair of low and top IR-Lines that are vertically aligned as safety gates (15, 16, 17 and 18). The safety gates are used completely independent of each other.

Figure 8:
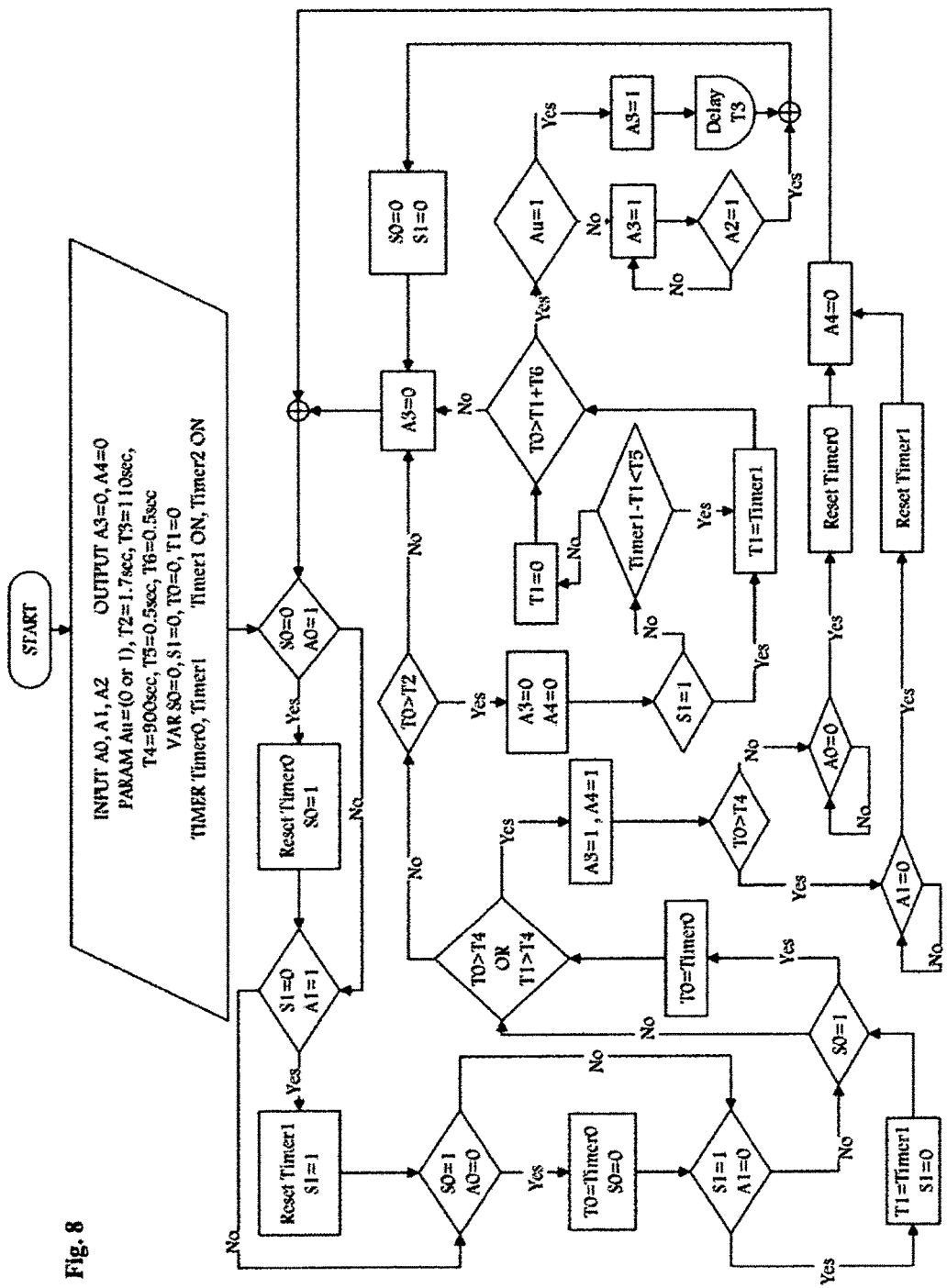
FIG. 8 is a flowchart explains the method used in an implemented example embodiment of the invention.
Figure 9:
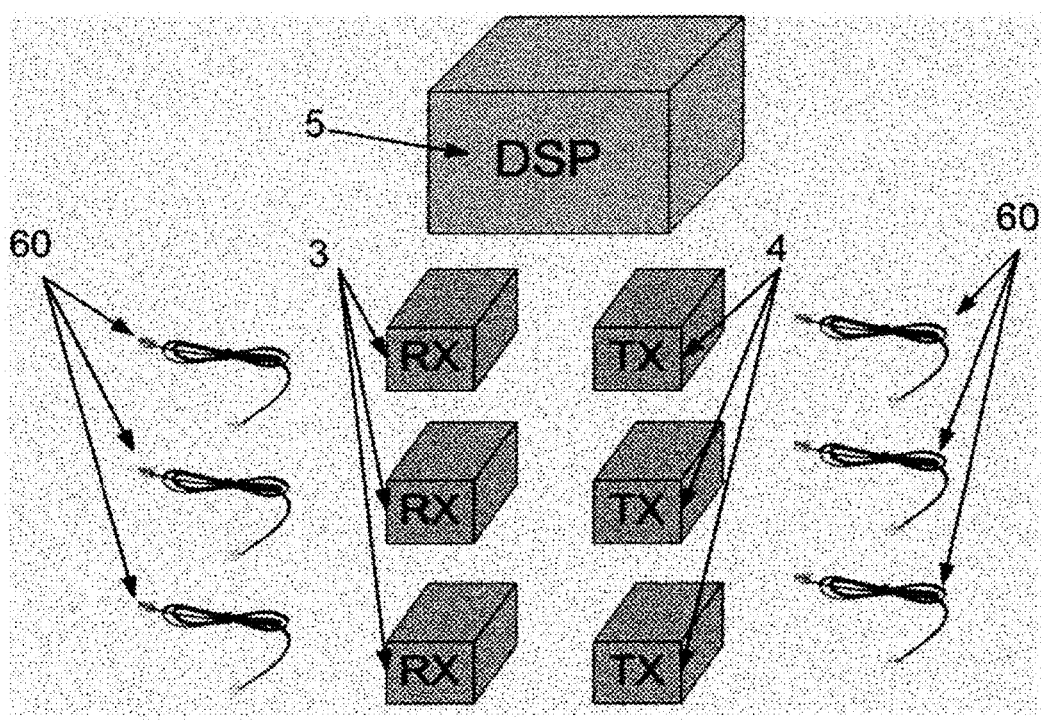
FIG. 9, shows the different components used in a manufactured example embodiment of the invention.

The algorithm used with each safety gate (15, 16, 17 and 18) is illustrated in the flowchart of FIG. 8. For the sake of simplicity, the speed of the escalator (1) is assumed to be 0.7 m/sec and is not received as a parameter. It is assumed that the effective length (21) of a fallen person detected by the low IR-Line (11, 12) is at least 120 cm, so the pulse width detected by that IR-Line (11, 12) would be $1.2*0.7^{-1}=1.7$ sec. This is given as the parameter T2=1.7 sec. The parameter Au is used to enable/disable the automatic restart function if Au=1/Au=0, respectively. That is, when Au=0, a manual restart would be required. The parameter T3=110 sec specifies the time that the algorithm should wait before restarting the escalator (1). If an IR-Line (11, 12 and 13) is disconnected for too long, it is interpreted as something has obstructed the IR-Line. In this case, the algorithm sends an alarm and stops the escalator (1), until the IR-Line is connected again. This long time is given as the parameter T4=900 sec. The parameter T5=0.5 sec denotes a negligible time which will be described later. The parameter T6=0.5 sec specifies the minimum difference between the pulse width detected by the low (11, 12) and the top (13) IR-Lines to confidently detect an accident.

The outputs of the algorithm are A3 and A4 with default value of 0. When the algorithm sets the A3=1, the escalator (1) will be stopped immediately. When the algorithm sets the A3=0, the escalator (1) will resume working. When the A4=1 or 0, the alarm is enabled or disabled, respectively.

The input of the low (11, 12) and the top (13) IR-Line to the algorithm is denoted by A0 and A1 parameters, respectively. A value of 0/1 indicates that the corresponding IR-Line is connected/disconnected, respectively. The input A2 is only applicable when Au=0, i.e. the manual mode for restarting is activated. When the escalators is stopped and Au=0, the A2 has to be set to 1, in order to restart the escalator (1). The A2 input is usually connected to a key, so that a guard can press it and set the A2=1, after the accident is addressed.

The example uses timers Timer0 and Timer1 to calculate the pulse width of the low (11, 12) and the top (13) IR-Lines of the safety gate (15,16,17,18), respectively. The pulse width measured by Timer0 and Timer1 is stored in the variables T0 and T1, respectively. The variables S0 and S1 store the last value of A0 and A1, respectively. The default value of the variables T0, T1, S0 and S1 is 0.

The above paragraphs described the first box of the flowchart of FIG. 8. Now the rest of the flowchart can be explained. In the next 4 blocks, if the low IR-Line (11, 12) was connected last time (S0=0), i.e. no object was in front of it, and now the low IR-Line (11, 12) is disconnected (A0=1), i.e. some object has entered its view; the rise time of the pulse is detected so Timer0 is reset. The same is done for the top IR-Line (13) and the associated input (A1), variable (S1), and timer (Timer1). The Next 4 blocks of the flowchart of FIG. 8, do the reverse job. This is, if the low IR-Line (11,12) was disconnected last time (S0=1), i.e. some object was in its view, and now the low IR-Line (11,12) is connected (A0=0), i.e. the object has moved, the fall time of the pulse is detected, so the current value of Timer0 is stored in variable T0. The same is done for the top IR-Line (13) and the associated input (A1), variables (S1, T1) and timer (Timer1). Now the current value of T0 and T1 contains the pulse width detected by the low (11, 12) and the top (13) IR-Line, respectively.

In the next 2 blocks, the current value of Timer0 is stored into T0 again, if the low IR-Line (11, 12) is still disconnected (S0=1), i.e. the object is still in its view. The reason is to compensate the delay introduced by the previous blocks, and to ensure that T0 contains an updated value of Timer0.

The next 7 blocks, check if an IR-Line (11, 12, 13) is disconnected for a long time (T4). This is done by checking that either T0>T4 or T1>T4 holds, which means that the low (11, 12) or the top (13) IR-Line is not working properly, respectively. If either condition holds, the system sends an alarm (7) by setting A4=1, and also stops the escalator (1) by setting A3=1. Depending on whether the source of the problem was the low (11,12) or the top (13) IR-Line, the algorithm waits for the corresponding input A0 or A1 to become 0, i.e. it waits until the problem is resolved. After that, the corresponding timer Timer0 or Timer1 is reset, so that in the next pass of the algorithm, the variable T0 or T1 will fetch this new small value of Timer0 or Timer1, respectively. This will prevent the alarm from being raised again in the next immediate pass of the algorithm.

But, if the detected pulse widths of the IR-Lines (11, 12 and 13) is not greater that T4, i.e. the alarm condition does not hold, the next 7 blocks check whether an accident has happened. First, the pulse width (T0) of the low IR-Line (11, 12) is compared to T2. If T0<T2 no accident has happened, and the algorithm moves to the next round. But if T0>T2, i.e. the pulse width detected by the low IR-Line (11,12) is greater than T2, then the pulse width of the top IR-Line (13) is checked, to decide if an accident has happened. Now, if the top IR-Line (13) is still disconnected (S1=1), i.e. the object is still in its view, then the current value of Timer1 is stored into T1 again. Otherwise, S1=0 and no object is in the view of the top IR-Line (13). Now if the algorithm jumps into the check T0>T1+T6, it might incorrectly report an over crowdedness situation as an accident. That's because in such situations, the people are standing next to each other, leaving no space between their foot and suite cases (14). So the low IR-Line (11, 12) might detect a wide pulse with a width (T0) greater than T2. But since the upper part of their body is slightly separated, the top IR-Line (13) might get connected and disconnected multiple times. This leads to a much shorter value for T1. This will cause the algorithm to incorrectly report an accident.

To overcome this problem, the short connecting time between two consecutive disconnects, is ignored and the corresponding pulses are merged into one big pulse. To do this, when the top IR-Line (13) is connected (S1=0), the difference between the current value of Timer1 and its last value (T1) is compared to T5. If Timer1-T1<T5 then the connect time is negligible, and the current value of Timer1 is stored in T1 again, i.e. the connected time is considered as the disconnect time. Otherwise, the T1 is set to 0, to make sure an accident will be detected by the next check (T0>T1+T6).

The check T0>T1+T6 decides whether an accident has happened or not. If not, the algorithm will set A3=0 to allow the escalator (1) to work, and goes back to the beginning. But if the accident is detected, the algorithm sets A3=1 to stop the escalator (1). Now if Au=1 the algorithm delays its execution for a time of T3, then sets A3=0 to restart the escalator (1). If Au=0 the algorithm will wait for the input A2 to become 1 indefinitely. When a guard pressed the manual restart button, it sets A2=1, and the escalator (1) will restart. After restarting the escalator (1), the algorithm will reset S0 and S1 to 0 before going back to the beginning.

It is obvious that the above specification was simply a few examples of the best mode of the invention. Other features and examples can be adjusted as needed.

The invention claimed is:

1. An Intelligent escalator emergency stop system, comprising:
multiple sensing devices located on predesignated places on said escalator, wherein said multiple sensing devices are installed along straight lines parallel to a path of said escalators, wherein each line has a fixed height from said path;
wherein an object is seen by one of said multiple sensing devices at a time;
a central processing unit (CPU); multiple imaging devices located along a length of said escalator, wherein an output of said multiple imaging devices is merged into one single image; wherein said single image is analyzed by an artificial intelligent method carried out on said CPU, in order to detect whether an accident has occurred and when needed to set on an alarm system and shutdown said escalator;
wherein said system further comprises a controller device capable of stopping said escalator during emergency situations and later on restarting said system, via receiving appropriate commands from said CPU; a communication media connects said multiple sensing devices, said CPU, said alarm system and said multiple imaging devices with each other; said system further comprising a control panel adjusting at least one of said escalator's speed, said multiple sensing devices operation and their on/off function, and said alarm system, said controller device and protocols for said communication media of said system; an on/off switch for said alarm system;
wherein at an entrance of said escalator a first set of sensing devices from said multiple sensing devices via a preprogrammed algorithm firstly detects a distance between said first set of sensing devices that are located at said entrance and storing said distance as width of said escalator that is a fixed value, and later on detects a first change in said distance via other sets of sensing devices when one or more people enter said escalator and constantly monitors said first change in distance and records it as normal situation; wherein at least a second set of sensing devices from said multiple sensing devices, adjacent to or at a neighboring location from said first set of sensing devices, installed on either side of said escalator detect a second change in said distance and records it as said emergence situation when one or more of said people lose their balance and fall; when a comparison between said first change and said second change in said distance exceeds a predefined value said CPU confirms an emergency and turns on said alarm system and said escalator is stopped.

2. The Intelligent escalator emergency stop system of claim 1, wherein said multiple sensing devices are installed and located at two different heights with respect to steps of said escalator; wherein a first group of sensing devices are installed at a first height with respect to said steps creating low IR-Lines and a second group of sensing devices that are installed in a second height with respect to said steps, creating high IR-Lines; wherein said second height is higher than said first height.

3. The Intelligent escalator emergency stop system of claim 2, wherein when a crowd of people enter said escalator said first and second changes in said distance between each one of said low IR-lines and said high IR-lines are monitored via said CPU and when a comparison in said first and second changes in said distance amongst said low IR-Lines and high IR-Lines separately exceeds a predefined range an emergency situation will be determined and said CPU will send an alarm signal to an alarm system and stops said escalator.

4. The Intelligent escalator emergency stop system of claim 3, wherein said multiple sensing devices comprise infrared sensors; comprising a transmitter and multiple receivers; wherein said receivers are installed on an opposite side of said escalator in comparison to their respective said transmitters.

5. The Intelligent escalator emergency stop system of claim 3, wherein said multiple sensing devices, comprises infrared sensors; comprising a transmitter and receivers; wherein said receivers are installed on a same side as said transmitter where a mirror must be installed in an opposite side and in front of said receivers, creating said low and/or high IR-Lines.

6. The Intelligent escalator emergency stop system of claim 4; wherein said IR sensors are narrow beam sensors.

7. The Intelligent escalator emergency stop system of claim 5, wherein said IR sensors are narrow beam sensors.

8. The Intelligent escalator emergency stop system of claim 3, wherein said multiple sensing devices comprising Laser or optical sensors, with a digital output of detecting an object in their view or having a zero digital output when nothing is in their view.

9. The Intelligent escalator emergency stop system of claim 3, wherein said multiple sensing devices are ultrasonic sensors or any type of electromagnetic transceiver.

10. The Intelligent escalator emergency stop system of claim 3, wherein said multiple imaging devices comprise a Synthetic Aperture Radar (SAR); wherein an antenna of said SAR is fixed in a middle location of said escalator; creating a wide view of any movements on said escalator and working in any lighting condition.

11. The Intelligent escalator emergency stop system of claim 4, wherein said multiple imaging devices comprises cameras.

12. The Intelligent escalator emergency stop system of claim 11, wherein said communication media is wired or wireless.

13. The Intelligent escalator emergency stop system of claim 12, wherein said alarm system sends out different alarm sound signals, wherein one of said signals is sent out during an emergency notifying anyone in an area around said escalator and another one of said signals is only sent out when said sensing devices needs calibration or is not working properly, notifying only an escalator maintenance personal; wherein said alarm signals are sent out via cell network (GSM), and/or internet.

14. The Intelligent escalator emergency stop system of claim 13, wherein said alarm is sent to guards and/or emergency agencies using SMS over said GSM cellular network.

15. The Intelligent escalator emergency stop system of claim 14, wherein different communication protocols having bandwidth frequencies and coding is used, that doesn't create interference with other commonly used communication channels used for cellphones and walk-talkies for transmitting said alarm signal in order to isolate said emitters and transmitters from other emitters, and also to provide a level of security of data.

16. The Intelligent escalator emergency stop system of claim 15, wherein said alarm signals including TTL data is made possible by using an RS485 protocol for remote distances.

17. The Intelligent escalator emergency stop system of claim 16, further comprising a Light Emitting Diode (LED) aligning each pair of said transmitter and said receivers, wherein when aligned said LED is turned on otherwise said LED is turned off.

18. The Intelligent escalator emergency stop system of claim 7, further comprising a Light Emitting Diode (LED) aligning each pair of said transmitter and said receivers, wherein when aligned said LED is turned on otherwise said LED is turned off.

19. An algorithm for an Intelligent escalator emergency stop system, comprising steps of:
calculating and detecting a width of an escalator via a first set of sensing devices located at an entrance and on either side of said escalator's interior wall;
storing and monitoring a first distance measured by said first set of said sensing devices; and
detecting and storing a first change in distance detected during a continuous measurement of said first distance between said first set of sensing devices in a central processing unit, indicating a time where a person or a group of people enter said escalator;
detecting and storing a second change in distance measured during a continuous measurement of at least a second distance between at least one other set of sensing devices in a central processing unit, wherein said at least one other set of sensing devices differs from said first set of sensing devices and also located on either side of said interior walls of said escalator;
comparing said first change in distance with said second change in distance; wherein when said comparison in said first and second change in distance exceeds a predefined range an emergency situation will be determined and said central processing unit will send an alarm signal to an alarm system and stops said escalator, wherein said first and at least one other set of sensing devices are installed and located at a first height and/or a second height with respect to steps of said escalator; wherein said first and at least one other set sensing devices comprise, transmitters and receivers; wherein a first set of said transmitters and said receivers are installed at said first height with respect to said steps creating low IR-Lines and/or a second set of said transmitters and said receivers are installed in said second height with respect to said steps, creating high IR-Lines.

20. The algorithm for an Intelligent escalator emergency stop system of claim 19, wherein when a crowd of people enter said escalator said first and second changes in said distance amongst each one of said low IR-lines and/or said high IR-lines is monitored via said CPU and when a comparison in said first and second changes amongst said low IR-Lines and/or high IR-Lines separately exceeds a predefined range an emergency situation will be determined and said CPU will send an alarm signal to an alarm system and stops said escalator.

21. The algorithm for an Intelligent escalator emergency stop system of claim 20, wherein said low IR-Lines and/or high IR-Lines are used in order to calculate said escalator's speed, wherein a time laps between an object passing a first low IR-Line and a neighboring low IR-line is depicted as T, and a distance between said first and neighboring low IR-Lines is denoted as X, therefore said escalator speed is computed as $V=X*T^{-1}$.

22. The algorithm for an intelligent escalator emergency stop system of claim 21, wherein said algorithm recognizes an accident independent of a location of a falling person on said escalator.

23. The algorithm for an Intelligent escalator emergency stop system of claim 22, wherein said algorithm detects said accident independent of a situation of a body of said fallen person whether said person has fallen and/or sitting and/or lying on said escalator.

24. The algorithm for an Intelligent escalator emergency stop system of claim 23, wherein environmental sounds are used as another input to said algorithm, therefore presence of shouting is an indication and a positive sign of said accident.

25. The algorithm for an Intelligent escalator emergency stop system of claim 24, wherein said algorithm provides adjustable restart of said escalator after said accident in two ways of manual and automatic modes; wherein said automatic restart time is programmed for 40, 70, 110 sec.

26. The algorithm for an intelligent escalator emergency stop system of claim 25, wherein said emergency stop system uses said escalator's existing voltage.

\* \* \* \* \*